2,793,138
Patented May 21, 1957

2,793,138

COATING WET METAL SURFACES WITH ASPHALT CUTBACK COMPOSITIONS

Clarence E. Wilkinson, Port Neches, Tex., assignor to The Texas Company, New York, N. Y., a corporation of Delaware No Drawing. Application April 20, 1956, Serial No. 579,438

4 Claims. (Cl. 117—49)

This invention is concerned with the coating of wet surfaces of metal objects with asphalt compositions capable of adhering to the wet surfaces and forming a protective covering over the metal. This application is a continuation-in-part of my similarly-entitled patent application Serial No. 218,905, filed on April 2, 1951.

It is frequently desired to apply an asphalt coating to such moist surfaces. It has been a problem to provide an asphalt composition possessing sufficient water repellency and adhesion to the moist metal so that a sufficiently good bond can be effected between the asphalt and the surface for development of a suitable protective coating.

A particular problem has resided in the inability to provide an asphalt cutback composition containing a filler such as asbestos for ready application to wet surfaces of metal objects. One important field for the applicant of such compositions is in the case of railroad cars which may be wet from rain or dew as they are brought into repair shops. Practice of my process provides a satisfactory, durable protective coating for them with pronounced ease.

Another very important field for use of my process is for painting metal tanks and other equipment, particularly those objects which are frequently or continually wet from rain, from cooling tower or other spray or from "sweating." The problems besetting the painter here are to get good adhesion to the wet surface, to have heavy one-coat coverage which goes on easily, e. g., more than about 0.15 pound per square foot, to have resistance to water spray, rain or the like of the applied coating during the curing period so that the uncured material does not wash off, and to have good durability after curing. An unsatisfactory painting job on such metal structures will fail as a rule in less than six months.

In accordance with my invention the wet surfaces of a variety of metal objects were painted with a plastic composition of vehicle and filler, the vehicle consisting essentially of an airblown asphalt of a softening point on the order of 180–200° F. Ring and Ball cut back with a light distillate thinner to a viscosity within a range of approximately 45–172 at 122° F. Saybolt Furol and tall oil, said filler comprising asbestos, there being 1–5% by weight tall oil, and about 10–38% by weight asbestos filler in said plastic composition. Excellent bonds were obtained without any difficulty. The plastic composition "loaded" readily on the surface to give the desirably heavy one-coat coverage, and was cured by evaporation of the thinner to form adherent protective coating on the surface of the metal object; such protective coating exhibited excellent weathering and durability properties.

Tall oil is a product obtained in paper manufacture from pine wood. It is a material of somewhat complex composition and includes rosin acids, fatty acids and non-acid constituents including sterols, higher alcohols, and other unsaponifiable matter.

The application of the above plastic compositions in the practice of my process can be done in a conventional manner, e. g., painting with a brush or spraying with a spray gun. In a particular embodiment of my invention an otherwise dry or partially dry surface of a metal object is deliberately wet with water preparatory to painting, and then the plastic composition is applied. This technique permits the painter to work faster than if he left the surface alone, particularly when using a brush, and at the same time he obtains desirably heavy coverage very easily. Preparatory to painting the metal surface can be cleaned of scale, rust, and other faulty material by conventional scraping and/or sandblasting, then can be protected from rusting with a conventional metal primer such as a zinc chromate-containing primer. This is particularly desirable where a substantial time interval exists between preparing the object for painting and the actual painting operation.

In accordance with my invention one can apply a plastic composition consisting essentially of an airblown asphalt of a softening point on the order of 180–200° F. Ring and Ball cutback with a light distillate thinner to a viscosity within a range of approximately 45–172 at 122° F. Saybolt Furol, about 10–38% by weight asbestos filler, and 1–5% by weight of tall oil, then curing the applied plastic composition by evaporation of the thinner to form a dark protective coating. The higher viscosity cutback vehicle, e. g., 62–172 Saybolt Furol seconds at 122° F., can be used quite effectively for such dark coating. When curing is over, aluminum or other paint can be applied to the dark asphaltic surface in conventional manner, if desired. Aluminum painting is customary in such instances.

A further aspect of my invention is the incorporation of aluminum powder as a fraction of the filler content of the plastic composition. The aluminum powder can be incorporated as such or as a paste or conventional pigment (containing some light petroleum distillate thinner as the pigment vehicle) in the manufacture of the plastic composition. The cutback vehicle in such case is advantageously a little less viscous than when aluminum is not used. Accordingly, the resultant plastic composition consists essentially of an airblown asphalt of softening point on the order of 180–200° F. Ring and Ball cutback with a light distillate thinner to a viscosity within a range of approximately 45–70 at 122° F. Saybolt Furol, about 10–38% by weight of asbestos filler, about 1–5% by weight of tall oil, and about 10–15% by weight of aluminum powder. Upon curing of this applied plastic composition by evaporation of the thinner an adherent protective coating is formed which is leafed with aluminum (i. e., flakes of aluminum cover the exterior of the film practically completely). In order to assist in obtaining sufficient loading of plastic on the surface and to obtain adequate leafing of the aluminum powder in the curing process viscosity of the cutback asphalt used in making the plastic composition should be maintained between approximately 45 and 70 at 122° F. Saybolt Furol. Substantially below about 10% aluminum powder in the plastic composition results in inadequate leafing coverage of the cured composition; substantially above about 15% aluminum powder in such composition is not necessary for good leafing and requires considerable agitation to obtain and maintain a substantially uniform dispersion of the metal.

Typical aluminum pigments useful in manufacture of the plastic composition are standard varnish pigment wherein a maximum of 0.2% of the powdered aluminum therein is retained on a 100 mesh U. S. Standard sieve, and extra-fine pigment wherein a maximum of 1.0% of the aluminum powder therein is retained on a 325 mesh U. S. Standard sieve. Ordinarily these pigments contain between about 30 and 40% of a light petroleum distillate vehicle of very high volatility such as benzene for making them into a paste. In the manufacture of the present plastic composition dispersion of the paste into warmed asphalt or asphalt cutback by mechanical agitation readily evaporates off this light pigment vehicle. A thorough dispersion of aluminum metal results. Alternatively, dry aluminum powder can be incorporated into the cutback or the asbestos-containing plastic composition.

The proportion of asbestos filler in the plastic composition is controlled to obtain the desirable one-coat loading, i. e. above 0.15 pound per square foot, by using at least 10% asbestos by weight in the composition, advantageously at least about 10.5–12.5%, and preferably at about 18% (e. g., between about 16.5–18.5% using ordinary plant control procedure). The asbestos filler content should not be substantially above about 38% by weight of the plastic composition in order to maintain its paintable consistency.

By way of example of the invention an airblown asphalt was cutback with naphtha to a viscosity of 172 at 122° F. Saybolt Furol and three mixtures were made with the cutback containing 1%, 3% and 5% (by weight), respectively, of tall oil. Each of the three compositions was mixed with asbestos in the proportion of 75% cutback, 22.5% fine asbestos, and 2.5% coarse asbestos (the percentages being by weight). Each composition was applied without difficulty to a wet galvanized iron panel. The panels were subjected to weathering. At the ends of 21 months, the coatings on the panels were still in excellent condition.

In additional examples of the invention compositions were prepared containing the following ingredients:

| | Percent by weight | | Percent by weight |
|---|---|---|---|
| Asphalt A | 32.4 | Asphalt B | 40.7 |
| Kerosene | 25.7 | Naphtha | 36.7 |
| Fine Asbestos | 30.6 | Fine Asbestos | 18.5 |
| Coarse Asbestos | 8.2 | Tall Oil | 4.1 |
| Tall Oil | 3.1 | | |

Asphalt A consisted of a mixture of vacuum residium and vacuum steam stilled residuum derived from paraffinic asphaltic residua which had been mixed and blown to a Ring and Ball softening point of 185–200° F. Asphalt B was a 202° F. Ring and Ball asphalt obtained from an asphaltic cyclic residuum by air blowing. The two compositions were readily applied to wet galvanized iron panels, and after being cured by evaporation of the thinner, were exposed to atmospheric conditions. At the end of 11 months the panel coatings were still in good condition.

Additional examples of the invention compositions were prepared based on asphalt which was an airblown asphalt of 180° F. Ring and Ball softening point cutback to a viscosity in the range between 45 and 70 Saybolt Furol seconds at 122° F. with a straight run distillate having initial boiling point and end point between about 300° and 400° F. These compositions contained 1.1–1.4% crude tall oil and 10, 16, and 29% fine asbestos, respectively. The compositions were painted on wet metal panels and cured. In each case adhesion to the wet metal was good. The uncured films were sprayed with water to determine their resistance to washing off. The films from compositions made with 29% and 16% asbestos had pronounced resistance to the water spray; the film made from the composition with 10% asbestos was satisfactory but not as good as the other two.

In larger scale preparation batches of test plastic composition of the following typical analysis (percentages by weight) were made up: 180° F. R & B airblown asphalt —41.95%±0.45%; straight run distillate boiling between 300°–400° F.—39.2%±0.3%; fine asbestos fibre—17.55%±0.75%; and tall oil—1.3%. Sieve analysis of the asbestos was as follows: 2% maximum on No. 12 screen; 60% maximum passing No. 12 and retained on No. 70, 13% maximum passing No. 70 and retained on No. 200, and 25% maximum passing No. 200 screen. Viscosity of the asphalt cutback so made with the above light distillate thinner was in the range from 45–70 Saybolt Furol seconds at 122° F.; specific gravity of the finished composition was between 0.995 and 1.025.

For one test application a steel tank was sandblasted and primed with a zinc chromate-containing primer in a conventional fashion. Preliminary to painting the tank a sample of the test composition was brushed on a piece of metal submerged in water. Complete coverage and good adhesion were obtained. Paintbrush application of test composition was made to a dry section of vertical tank surface, and then to a corresponding completely water-wet section of tank surface to obtain one-coat coverage of 2.5 gallons per hundred square feet (0.208–0.214 pound per square foot). It was noted that painting on the wetted surface was more rapid and easier than on the dry one. Adhesion to the wetted surface was excellent, and a continuous protective film which did not wrinkle on curing was obtained.

Spray application of test composition was then made to a wet surface of the tank to obtain one-coat coverage of 3 gallons per hundred square feet (0.249–0.258 pound per square foot). Time required for spray application was about 15 minutes per hundred square feet using conventional paint spraying equipment. A section of the freshly sprayed surface was subjected to a strong stream of water for 5 minutes; the uncured coating did not wash off. After curing a continuous unwrinkled film resulted.

Further large scale test spray applications of the above test composition were made to various metal tanks, sandblasted and primed as previously described, and to lines in locations where severe wetting conditions were prevalent, e. g., in the area of spray impingement near water cooling towers. Excellent adhesion and one-coat coverage was obtained at a loading of 4 gallons of test composition per hundred square feet of surface painted. Over a test period of about two years an aggregate of approximately 68,000 square feet of such metal surface was painted in accordance with the invention principles. Some of the so-coated tankage was further painted with aluminum paint in the customary manner 30 to 60 days after spraying the composition. Periodically these plastic-coated surfaces were inspected critically and found to be permanently bonded for lasting protection.

Several aluminum-containing compositions were formulated for testing in accordance with the principles of my invention. In the preparation 180° F. R&B airblown asphalt was cut back with straight run distillate having a boiling range of 300° to 400° F. to obtain viscosity in the range of 45–70 Saybolt Furol seconds at 122° F.; crude tall oil was added to the cutback, then aluminum pigment (65% aluminum—35% highly volatile carrier, 99% of the aluminum particles passing a 325 mesh screen). The pigment was dispersed in warmed cutback by mechanical agitation and the pigment carrier allowed to evaporate in the process; then fine asbestos fibre was added to the mixture. Several exemplary materials were obtained as described in the table below:

| Ingredient, Weight Percent of Composition | Composition | | | |
|---|---|---|---|---|
| | A | B | C | D |
| Asphalt | 40.60 | 39.43 | 38.93 | 36.75 |
| Straight Run Distillate | 38.03 | 36.83 | 36.35 | 34.34 |
| Crude Tall Oil | 1.28 | 1.24 | 1.22 | 1.16 |
| Aluminum Powder | 10.00 | 12.50 | 13.50 | 12.75 |
| Asbestos Fibre | 10.00 | 10.00 | 10.00 | 15.00 |

Samples of each of these compositions were applied to wet galvanized and black iron panels by brush and by spray. It was found that desirably heavy films were easy to apply and good adhesion was obtained in all cases. The films cured to form a heavy protective coating which was well leafed with aluminum.

In larger scale testing, spray application of test composition B, above, was made to the wet surface of a steel tank using conventional plant spraying equipment. No difficulty was encountered in obtaining a substantially uniform loading above 0.15 pound per square foot. Adhesion was excellent and none of the uncured plastic composition washed off when a strong stream of water was played on it immediately after the coating was sprayed on the wet surface on the tank. The freshly-applied coating had a golden sheen; it dried to a bright shiny aluminum appearance, which, on periodic critical inspection, has been found to be permanently bonded for lasting protection.

Obviously, many modifications and variations of the invention, as hereinbefore set forth, may be made without departing from the spirit and scope thereof, and therefore only such limitations should be imposed as are indicated in the appended claims.

I claim:

1. The method of coating the wet surfaces of a metal object which comprises painting such surface with a plastic composition of vehicle and filler, said vehicle consisting essentially of an air blown asphalt of a softening point on the order of 180–200° F. Ring and Ball cutback with a light distillate thinner to a viscosity within a range of approximately 45–172 at 122° F. Saybolt Furol and tall oil, said filler comprising asbestos, there being 1–5% by weight tall oil and about 10–38% by weight asbestos filler in said plastic composition, and curing the applied plastic composition by evaporation of the thinner to form a permanent adherent protective coating on the metal surface.

2. The method of coating the wet surface of a metal object comprises painting such surface with a plastic composition consisting essentially of an air blown asphalt of a softening point on the order of 180–200° F. Ring and Ball cutback with a light distillate thinner to a viscosity within a range of approximately 45–172 at 122° F. Saybolt Furol, about 18–38% by weight asbestos filler, and 1–5% by weight of tall oil, and curing the applied plastic composition by evaporation of the thinner to form a permanent adherent protective coating on the metal surface.

3. The method of coating the wet surface of a metal object which comprises painting such surface with a plastic composition consisting essentially of an air blown asphalt of a softening point on the order of 180–200° F. Ring and Ball cutback with a light distillate thinner to a viscosity within a range of approximately 45–75 at 122° F. Saybolt Furol, about 10–38% by weight of asbestos filler, about 1–5% by weight of tall oil, and about 10–15% by weight of aluminum powder, and curing the applied plastic composition by evaporation of the thinner to form a permanent adherent protective coating on the metal surface, said coating leafed with aluminum.

4. The method of applying a protective surface coating to a metal object which comprises wetting the surface of said metal object with water, painting the wetted surface with a plastic composition of vehicle and filler, said vehicle consisting essentially of an air blown asphalt of a softening point on the order of 180–200° F. Ring and Ball cutback with a light distillate thinner to a viscosity within a range of approximately 45–172 at 122° F. Saybolt Furol and tall oil, said filler comprising asbestos, there being 1–5% by weight tall oil and about 10–38% by weight asbestos filler in said plastic composition, and curing the applied plastic composition by evaporation of the thinner to form a permanent adherent protective coating on the metal surface.

No references cited.